(12) United States Patent
Srinivasa et al.

(10) Patent No.: US 9,407,406 B2
(45) Date of Patent: Aug. 2, 2016

(54) TONE REORDERING IN A WIRELESS COMMUNICATION SYSTEM

(75) Inventors: Sudhir Srinivasa, Sunnyvale, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 13/250,661

(22) Filed: Sep. 30, 2011

(65) Prior Publication Data

US 2012/0087436 A1  Apr. 12, 2012

Related U.S. Application Data

(60) Provisional application No. 61/405,109, filed on Oct. 20, 2010, provisional application No. 61/392,430, filed on Oct. 12, 2010, provisional application No. 61/390,833, filed on Oct. 7, 2010.

(51) Int. Cl.
*H04L 5/00* (2006.01)
*H04L 1/00* (2006.01)

(52) U.S. Cl.
CPC .............. *H04L 5/0044* (2013.01); *H04L 1/0057* (2013.01); *H04L 1/0059* (2013.01); *H04L 5/0023* (2013.01)

(58) Field of Classification Search
CPC .... H04L 1/0643; H04L 1/0071; H04L 5/0046
USPC .......... 375/260, 267, 299, 340; 370/203, 208, 370/310, 336, 338
See application file for complete search history.

(56) References Cited

U.S. PATENT DOCUMENTS

| 7,599,332 B2 | 10/2009 | Zelst et al. |
| 7,742,390 B2 | 6/2010 | Mujtaba |

(Continued)

FOREIGN PATENT DOCUMENTS

| EP | 2056510 A2 | 5/2009 | |
| GB | EP 2056510 | * 6/2009 | ................ H04L 1/00 |

(Continued)

OTHER PUBLICATIONS

International Search Report and Written Opinion for International Application No. PCT/US2011/054315 dated Dec. 16, 2011.

(Continued)

*Primary Examiner* — Daniel Washburn
*Assistant Examiner* — Eboni Hughes (57) ABSTRACT

In a method for generating an orthogonal frequency division multiplexing (OFDM) symbol to be included in a PHY data unit for transmission via a communication channel, wherein the OFDM symbol includes a plurality of OFDM tones, information bits to be included in the OFDM symbol are encoded to generate encoded information bits. The encoded information bits are parsed into a plurality of spatial streams. The spatial streams, or space-time streams generated from the spatial streams, are mapped to transmit chains using a plurality of spatial mapping matrices corresponding to the plurality of OFDM tones. Additionally, one of i) reordering OFDM tones before spatial mapping is applied, or ii) reordering OFDM tones after spatial stream mapping is applied and reordering spatial mapping matrices to match the reordered OFDM tones is performed. The OFDM symbol to be included in the PHY data unit is generated.

22 Claims, 9 Drawing Sheets

(56) References Cited

U.S. PATENT DOCUMENTS

| | | | |
|---|---|---|---|
| 8,155,138 B2 | 4/2012 | van Nee | |
| 8,270,909 B2 | 9/2012 | Zhang et al. | |
| 8,289,869 B2 | 10/2012 | Sawai | |
| 8,619,907 B2 | 12/2013 | Mujtaba et al. | |
| 2007/0140364 A1* | 6/2007 | Ouyang et al. | 375/260 |
| 2008/0253337 A1* | 10/2008 | Kim | 370/336 |
| 2008/0253478 A1* | 10/2008 | Kim | H04B 7/0617 375/299 |
| 2009/0196163 A1 | 8/2009 | Du | |
| 2010/0055152 A1 | 3/2010 | Wahi | |
| 2010/0309834 A1* | 12/2010 | Fischer | H04B 7/0452 370/312 |
| 2011/0002219 A1* | 1/2011 | Kim | H04B 7/0417 370/203 |
| 2011/0026623 A1* | 2/2011 | Srinivasa | H04L 1/0016 375/260 |
| 2012/0039196 A1 | 2/2012 | Zhang | |
| 2012/0076219 A1* | 3/2012 | Srinivasa | H04L 1/0033 375/260 |
| 2012/0327868 A1* | 12/2012 | Taghavi Nasrabadi et al. | 370/329 |

FOREIGN PATENT DOCUMENTS

| | | |
|---|---|---|
| JP | 2013-543326 A | 11/2013 |
| WO | WO-2007/015962 A2 | 2/2007 |
| WO | WO-2010/062051 A2 | 6/2010 |
| WO | WO-2012/048145 | 4/2012 |

OTHER PUBLICATIONS

IEEE Std 802.11 b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, (1999).

"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007. Part 1 of 2.

"IEEE P802.11n™/D3.00, Draft Standard for Information Technology—Telecommunications and information exchange between systems™Local and metropolitan area networks™Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007. Part 2 of 2.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009. Part 1 of 3.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009. Part 2 of 3.

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009. Part 3 of 3.

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, (1999).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," *The Institute of Electrical and Electronics Engineers, Inc.*, 1999.

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, May 2002.

IEEE Std P802.11-REVma/06.0, "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications. (This document reflects the combining of the 2003 Edition of 802.11 plus the 802.11 g, 802.11 h, 802.11 i and 802.11j Amendments) (Revision of IEEE Std 802.11-1999) (Superseded by P802.11-REVma_D7.0)," 2006.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Chen, "Home Network Basis: Transmission Environments and Wired/Wireless Protocols," Prentice Hall (Jul. 2003).

Hiertz, et al., "The IEEE 802.11 Universe," IEEE Communications Magazine, pp. 62-70, Jan. 2010.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

van Nee, et al. "The 802.11n MIMO-OFDM Standard for Wireless LAN and Beyond," Wireless Personal Communications, vol. 37, pp. 445-453 (Jun. 2006).

(56) References Cited

OTHER PUBLICATIONS

Stacey et al., "IEEE P802.11, Wireless LANs, Proposed TGac Draft Amendment," Institute of Electrical and Electronics Engineers, doc. No. IEEE 802.11-10/1361r3 (Jan. 2011).

Stacey et al., "Specification Framework for TGac," document No. IEEE 802.11-09/0992r20, *Institute for Electrical and Electronics Engineers*, pp. 1-49, Jan. 18, 2011.

Perahia, et al., "Gigabit Wireless LANs: an overview of IEEE 802.11ac and 80211ad," ACM SIGMOBILE Mobile Computing and Communications Review, vo. 15, No. 3, pp. 23-33, Jul. 2011.

International Preliminary Report on Patentability and Written Opinion for International Application No. PCT/US2011/054315, dated Apr. 9, 2013.

Second Office Action in Chinese Application No. 2011800484057, dated Jan. 5, 2016, with English translation (7 pages).

Ansari, et al., "Unified MIMO Pre-Coding Based on Givens Rotation," *The Institute of Electrical and Electronics Engineers*, doc. No. IEEE C802.16e-04/516r2, pp. 1-13, (Jan. 11, 2005).

Kim et al, "160 MHz Transmission Flow," IEEE 802.11-10/1063r1, 27 pages (Sep. 13, 2010).

Liu et al., "Interleavers for 160 MHz Transmission," IEEE 802.11-1118-01, 16 pages (Sep. 12, 2010).

Love et al., "An Overview of Limited Feedback in Wireless Communication Systems," IEEE J. on Selected Areas in Communications, vo. 26, No. 8, pp. 1341-1365 (Oct. 2008).

Zhang et al., "Beamforming Feedback for Single Stream," *The Institute of Electrical and Electronics Engineers*, doc. No. IEEE 802.11-12/1312r0, pp. 1-22 (Nov. 12, 2012).

Office Action in Japanese Application No. 2013-532849, dated May 26, 2015, with English translation (7 pages).

First Office Action for Chinese Application No. 201180048405.7, dated Apr. 27, 2015, with English translation (18 pages).

\* cited by examiner

| Stream 1 | 1 | 10 | 22 | 31 | 43 | 52 |
|---|---|---|---|---|---|---|
| Stream 2 | 2 | 11 | 23 | 32 | 44 | 53 |
| | 3 | 12 | 24 | 33 | 45 | 54 |
| | 4 | 13 | 25 | 34 | 37 | 46 |
| | 5 | 14 | 26 | 35 | 38 | 47 |
| | 6 | 15 | 27 | 36 | 39 | 48 |
| | 7 | 16 | 19 | 28 | 40 | 49 |
| | 8 | 17 | 20 | 29 | 41 | 50 |
| Stream $N_{ss}$ | 9 | 18 | 21 | 30 | 42 | 51 |

*FIG. 7A*

| Stream 1 | 1 | 2 | 25 | 26 | 49 | 50 |
|---|---|---|---|---|---|---|
| Stream 2 | 3 | 4 | 27 | 28 | 51 | 52 |
| | 5 | 6 | 29 | 30 | 53 | 54 |
| | 7 | 8 | 31 | 32 | 37 | 38 |
| | 9 | 10 | 33 | 34 | 39 | 40 |
| | 11 | 12 | 35 | 36 | 41 | 42 |
| | 13 | 14 | 19 | 20 | 43 | 44 |
| | 15 | 16 | 21 | 22 | 45 | 46 |
| Stream $N_{ss}$ | 17 | 18 | 23 | 24 | 47 | 48 |

TONE REORDERING IN A WIRELESS COMMUNICATION SYSTEM

CROSS-REFERENCES TO RELATED APPLICATIONS

This disclosure claims the benefit of the following U.S. Provisional Patent Applications:

U.S. Provisional Patent Application No. 61/390,833, filed on Oct. 7, 2010;

U.S. Provisional Patent Application No. 61/392,430, filed on Oct. 12, 2010; and

U.S. Provisional Patent Application No. 61/405,109, filed on Oct. 20, 2010.

The disclosures of all of the above-referenced patent applications are hereby incorporated by reference herein in their entireties.

FIELD OF THE DISCLOSURE

The present disclosure relates generally to communication networks and, more particularly, to tone reordering in a wireless communication system that utilizes multiple tones or subchannels in a communication channel.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In one embodiment, a method for generating an orthogonal frequency division multiplexing (OFDM) symbol to be included in a PHY data unit for transmission via a communication channel, wherein the OFDM symbol includes a plurality of OFDM tones, includes encoding information bits to be included in the OFDM symbol to generate encoded information bits. The method also includes parsing the encoded information bits into a plurality of spatial streams and mapping the spatial streams, or space-time streams generated from the spatial streams, to transmit chains using a plurality of spatial mapping matrices corresponding to the plurality of OFDM tones. The method further includes performing one of i) reordering OFDM tones before spatial mapping is applied, or ii) reordering OFDM tones after spatial stream mapping is applied and reordering spatial mapping matrices to match the reordered OFDM tones. The method further still includes generating the OFDM symbol to be included in the PHY data unit.

In another embodiment, an apparatus for generating an orthogonal frequency division multiplexing (OFDM) symbol to be included in a PHY data unit for transmission via a communication channel, wherein the OFDM symbol includes a plurality of OFDM tones, includes one or more encoders configured to encode information bits to be included in the OFDM symbol to generate encoded information bits and a stream parser configured to parse the encoded information bits into a number of spatial streams. The apparatus also includes a spatial mapping unit configured to map i) the spatial streams or ii) space-time streams generated from the spatial streams to transmit chains using a plurality of spatial mapping matrices corresponding to the plurality of OFDM tones. The apparatus further includes a tone ordering unit configured to perform one of i) reordering OFDM tones before spatial mapping is applied, or ii) reordering OFDM tones after spatial stream mapping is applied and reordering spatial mapping matrices to match the reordered OFDM tones. Additionally, the apparatus is configured to generate the OFDM symbol to be included in the PHY data unit.

DETAILED DESCRIPTION

In embodiments described below, a wireless network device such as an access point (AP) of a wireless local area network (WLAN) transmits data streams to one or more client stations. The data units transmitted by the AP to the client stations are encoded using various coding schemes, according to various embodiments and/or scenarios. In some embodiment and/or scenarios, binary convolutional codes (BCC) are utilized for encoding data streams. Alternatively, in other embodiments and/or scenarios, the data streams are encoded using block-based codes, such as, for example, low density parity check (LDPC) codes. An LDPC code generally distributes adjacent information bits or adjacent blocks of information bits to nonadjacent locations within the coded stream, according to an embodiment. However, in some embodiments, an LDPC code used for a particular channel bandwidth is not long enough to encompass all information bits transmitted in a corresponding channel, and consequently, in some such embodiments, more than one codeword is used to encode the data. As a result, in these embodiments, coded bits corresponding to an LDPC code are transmitted over a fraction of spatial streams and/or in a fraction of the channel bandwidth, and therefore, full frequency diversity is not achieved in these situations. In some such embodiments, a tone reordering technique is utilized to spread coded information bits corresponding to a codeword over the channel bandwidth, thereby allowing frequency diversity to be better utilized.

Figure 1:
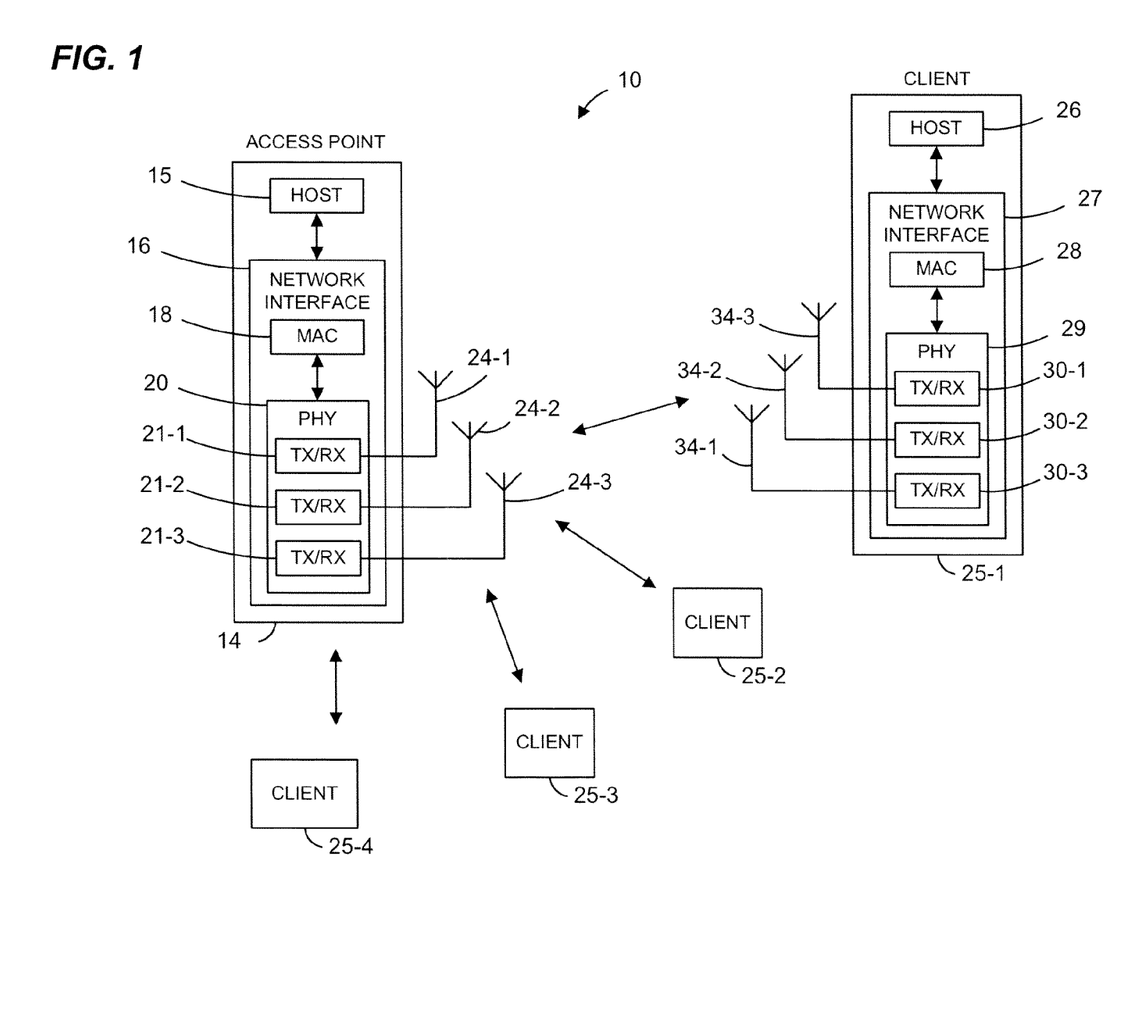
FIG. 1 is a block diagram of an example wireless communication network in which tone reordering techniques are utilized, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol. The first communication protocol is also referred to herein as a very high throughput (VHT) protocol. In another embodiment, the MAC unit processing 18 and the PHY processing unit 20 are also configured to operate according to at least a second communication protocol (e.g., the IEEE 802.11n Standard, the IEEE 802.11g Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the first communication protocol.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or all of the client stations 25-2, 25-3 and 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol. The transceiver(s) 21 is/are configured to transmit the generated data units via the antenna(s) 24. Similarly, the transceiver(s) 21 is/are configured to receive data units via the antenna(s) 24. The PHY processing unit 20 of the AP 14 is configured to process received data units conforming to the first communication protocol, according to an embodiment.

In various embodiments, the PHY processing unit 29 of the client device 25-1 is configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol, according to an embodiment.

Figure 2:
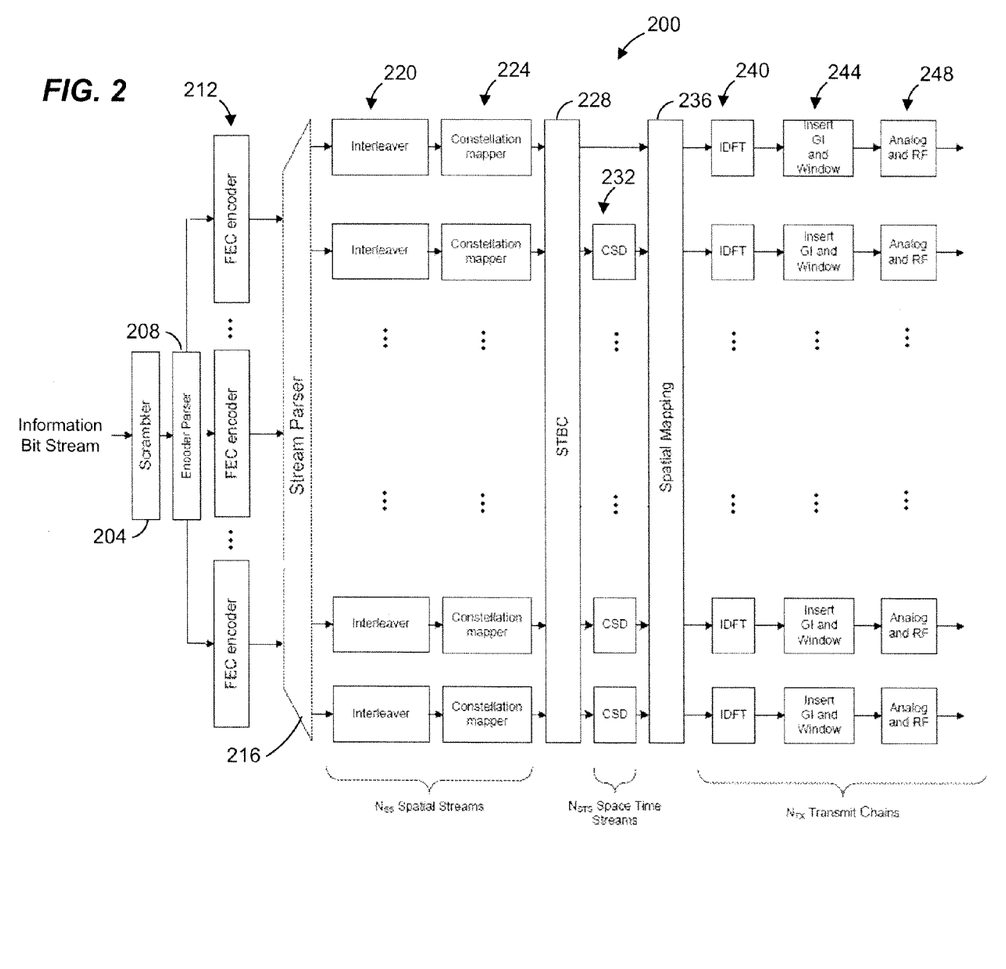
FIG. 2 is a block diagram of an example physical layer (PHY) processing unit, according to an embodiment.

FIG. 2 is a block diagram of an example PHY processing unit 200 configured to operate according to the VHT protocol, according to an embodiment. Referring to FIG. 1, the AP 14 and the client station 25-1, in one embodiment, each include a PHY processing unit such as the PHY processing unit 200.

The PHY unit 200 includes a scrambler 204 that generally scrambles an information bit stream to reducean occurrence of long sequences of ones or zeros, according to an embodiment. In another embodiment, the scrambler 204 is replaced with a plurality of parallel scramblers located after an encoder parser 208. In this embodiment, each of the parallel scramblers has a respective output coupled to a respective one of a plurality of FEC encoders 212. The plurality of parallel scramblers operates simultaneously on a demultiplexed stream. In yet another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Each FEC encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 additionally includes a binary convolutional encoder followed by a puncturing block. In this embodiment, each FEC encoder 212 is configured to implement one or more of: 1) binary convolutional encoding without puncturing; 2) binary convolutional encoding with puncturing; or 3) LDPC encoding.

A stream parser 216 parses the one or more encoded streams into one or more spatial streams for separate interleaving and mapping into constellation points. Corresponding to each spatial stream, an interleaver 220 interleaves bits of the spatial stream (i.e., changes the order of the bits) to prevent long sequences of adjacent noisy bits from entering a decoder at the receiver. In one embodiment, interleavers 220 are utilized only for data encoded using BCC encoding. Generally, in a data stream encoded using an LDPC code, adjacent bits are spread out by the code itself and, according to an embodiment, no further interleaving is needed. Accordingly, in some embodiments, interleavers 220 are omitted when LDPC encoding is used. On the other hand, in another embodiment, for example if a particular code length is such that data bits are not spread out over an entire channel bandwidth, but are spread out over only a portion of the channel bandwidth, interleavers 220 are utilized to further interleave the LDPC encoded bits. In some embodiments, however, interleaving LDPC encoded bits results in unnecessary added latency, and other techniques (such as tone reordering, described herein) are utilized to spread the coded bits over a bandwidth of a communication channel.

Also corresponding to each spatial stream, a constellation mapper 224 maps a sequence of bits to constellation points corresponding to different subcarriers of an orthogonal frequency division multiplexing (OFDM) symbol. More specifically, for each spatial stream, the constellation mapper 224 translates every bit sequence of length $\log_2(M)$ into one of M constellation points, in an embodiment. The constellation mapper 224 handles different numbers of constellation points depending on the modulation and coding scheme (MCS) being utilized. In an embodiment, the constellation mapper 224 is a quadrature amplitude modulation (QAM) mapper that handles M=2, 4, 16, 64, 256, and 1024. In other embodiments, the constellation mapper 224 handles different modulation schemes corresponding to M equaling different subsets of at least two values from the set {2, 4, 16, 64, 256, 1024}.

In an embodiment, a space-time block coding unit 228 receives the constellation points corresponding to the one or more spatial streams and spreads the spatial streams to a greater number of space-time streams. In some embodiments, the space-time block coding unit 228 is omitted. A plurality of cyclic shift diversity (CSD) units 232 are coupled to the space-time block unit 228. The CSD units 232 insert cyclic shifts into all but one of the space-time streams (if more than one space-time stream) to prevent unintentional beamforming. For ease of explanation, the inputs to the CSD units 232 are referred to as space-time streams even in embodiments in which the space-time block coding unit 228 is omitted.

In one embodiment, the frequency CSD values applied on each of four space-time streams are the same as the frequency CSD values specified in the IEEE 802.11n Standard. In another embodiment, the frequency CSD values applied on each of four space-time streams are suitable values different than the frequency CSD values specified in the IEEE 802.11n Standard. In one embodiment, if more than four space-time streams are utilized, the frequency CSD values are defined similarly to the definitions in the IEEE 802.11n Standard.

In one embodiment, the time CSD values applied on each of four space-time streams are the same as the time CSD values specified in the IEEE 802.11n Standard. In another embodiment, the time CSD values applied on each of four space-time streams are suitable values different than the time CSD values specified in the IEEE 802.11n Standard. In one embodiment, if more than four space-time streams are utilized, the time CSD values are defined to be values within the range [−200 0] nanoseconds (ns). In another embodiment, if more than four space-time streams are utilized, the time CSD values are defined to be values within a suitable range different than the range [−200 0] ns.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 236 corresponds to a transmit chain, and each output of the spatial mapping unit 236 is operated on by an inverse discrete Fourier transform (IDFT) calculation unit 240, e.g., an inverse fast Fourier transform calculation unit, that converts a block of constellation points to a time-domain signal. Outputs of the IDFT units 240 are provided to GI insertion and windowing units 244 that prepend, to each OFDM symbol, a guard interval (GI) portion, which is a circular extension of the OFDM symbol in an embodiment, and smooth the edges of each symbol to increase spectral decay. Outputs of the GI insertion and windowing units 244 are provided to analog and RF units 248 that convert the signals to analog signals and upconvert the signals to RF frequencies for transmission. The signals are transmitted in a 20 MHz, a 40 MHz, an 80 MHz, a 120 MHz, or a 160 MHz bandwidth channel, in various embodiments and/or scenarios. In other embodiments, other suitable channel bandwidths are utilized.

According to an embodiment, the VHT protocol defines one or more specific codewords to be used by the FEC encoders 212 when performing LDPC encoding. For example, in one embodiment, three possible codeword lengths are defined for the VHT protocol, and the specific codeword lengths are 648 bits, 1296 bits and 1944 bits. In another embodiment, only one of the 648 bits, 1296 bits, or 1944 bits codeword lengths is utilized. In other embodiments, one or more other suitable codeword lengths are defined. Generally, longer data units are encoded using longer codewords, in various embodiments and/or scenario, for example when the particular MCS being utilized corresponds to a larger bandwidth and/or a higher number of spatial streams. In one embodiment, the LDPC codes are defined as in the IEEE 802.11n Standard. In another embodiment, the LDPC codes are defined as in the IEEE 802.11n Standard, but using only one of multiple codeword lengths defined in the IEEE 802.11n Standard. In another embodiment, one or more other suitable LDPC codes are defined by the VHT protocol different than those defined by the IEEE 802.11n Standard.

Generally, an LDPC code distributes consecutive coded bits throughout a channel bandwidth, and therefore, if a channel experiences adverse conditions in a portion the channel, the data can still be recovered at the receiver due to error correcting nature of the code. In some embodiments and/or scenarios, however, an LDPC code used to encode a data stream is less than the number of information bits in a corresponding OFDM symbol, and, accordingly, in these embodiments and/or scenarios, the LDPC code distributes coded bits over only a portion of the channel. For example, in an embodiment, LDPC codes are defined as in IEEE 802.11n Standard and the longest available codeword length is, accordingly, equal to 1944. The number of coded bits in an OFDM symbol, on the other hand, is higher than 1944 in some situations, particularly when a large bandwidth channel (e.g., 80 MHz or a 160 MHz channel) and/or a large number of spatial streams (e.g., five or more spatial streams) are being utilized. Accordingly, in at least some such embodiments and/or scenarios, more than one codeword is used to generate an OFDM symbol, wherein each codeword corresponds to a portion of the coded bits in an OFDM symbol. As a result, in such embodiments and/or scenarios, the LDPC coded bits are generally distributed over a number of blocks of data tones, wherein the number of blocks corresponds to the number of codewords used to encode the data. Consequently, in such embodiments and/or scenarios, frequency diversity is only partially utilized.

In some such embodiments, to ensure a better distribution of coded bits over a channel bandwidth, tones in an OFDM symbol are reordered according to a tone reordering scheme, and the coded data bits or modulation symbols are mapped onto the reordered data tones for transmission. More specifically, if more than one codeword is used to generate an OFDM symbol, OFDM tones are reordered such that bits (or blocks of bits) corresponding to each codeword are mapped onto nonconsecutive data tones in an OFDM symbol, wherein the distance between the tones onto which consecutive bits or blocks of bits are mapped is defined such that information bits corresponding to each of the codewords are distributed over the OFDM symbol.

Figure 3:
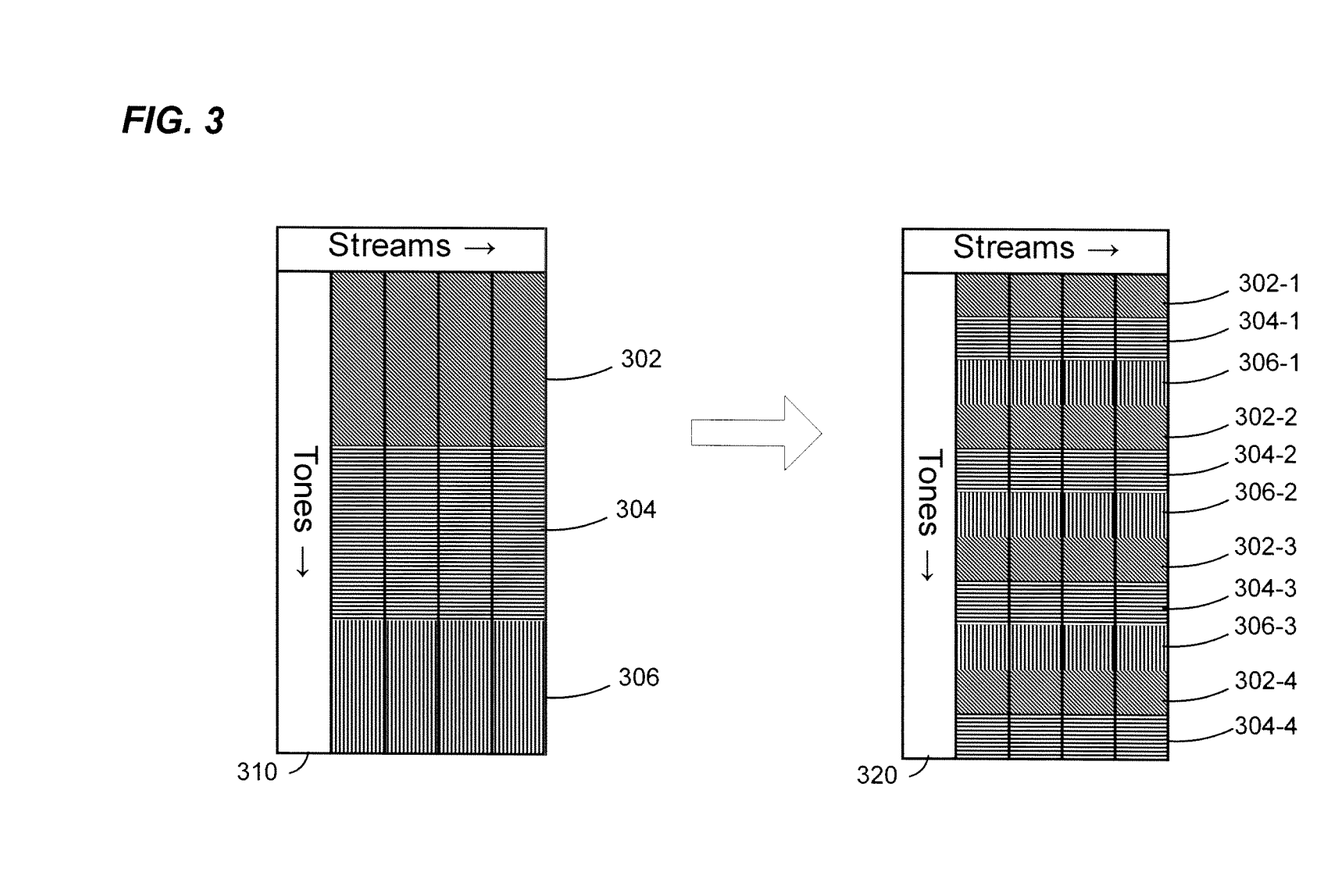
FIG. 3 is a diagram illustrating tone reordering in an OFDM symbol, according to an embodiment.

FIG. 3 is a diagram illustrating tone reordering in an OFDM symbol, according to one such embodiment. Block 310 represents an OFDM symbol encoded using three codewords, wherein each codeword covers a respective portion of the OFDM symbol. More specifically, block 302 corresponds to a first codeword, block 304 corresponds to a second codeword, and block 306 corresponds to a third codeword. Accordingly, as illustrated in FIG. 3, data corresponding to each codeword is transmitted over the corresponding portion of the channel bandwidth. In this situation, as discussed above, if a portion of the channel experiences adverse conditions, such as fading or scattering, the data corresponding to the codeword in the affected portion of the channel may be greatly compromised, generally resulting in decoding errors for that portion of the channel.

With continued reference to FIG. 3, in the OFDM symbol 320, OFDM tones are reordered such that data bits (or modulation symbols) corresponding to each of the three codewords are distributed throughout the channel bandwidth. For example, as a result of tone reordering, data bits corresponding to the first codeword are mapped to the data tones represented by 302-1, 302-2, 302-3 and 302-4. Similarly, data bits corresponding to the second codeword are mapped to the data tones represented by 304-1, 304-2, 304-3 and 304-4, and data bits corresponding to the third codeword are mapped to the data tones represented by 306-1, 306-2 and 306-3. In this case, in an embodiment, if a portion of a channel experiences adverse conditions, data corresponding to a part of each codeword, rather than data corresponding to a whole codeword is affected. As a result, in this case, due to error correcting nature of the LDPC code, the corresponding data can be recovered at the receiver even in situations in which data transmitted in the portion of the channel is greatly compromised, in various embodiments and/or scenarios.

In various embodiments, a PHY processing unit and/or a MAC processing unit, such as the PHY processing 20 and/or the MAC processing unit 18 (FIG. 1), respectively, performs tone reordering at various locations within the processing flow. For example, now referring to FIG. 2, in one embodiment, tone reordering is performed for each spatial stream at the outputs of the spatial stream parser 216. As another example, in another embodiment, tone reordering is performed for each spatial stream at the output of the corresponding constellation mapper 224. In another embodiment, tone reordering is performed for each space-time stream at the corresponding output of the space-time stream mapping unit 228. In another embodiment, tone reordering is performed for each space-time stream at the corresponding input to the spatial mapping unit 236. In another embodiment, tone reordering is performed for each space-time stream at the corresponding output of the spatial mapping unit 236. In one embodiment, tone reordering for each space-time stream is performed by the corresponding IDFT unit 240. In other embodiments, tone reordering is performed at other suitable locations within a PHY and/or a MAC processing flow.

With continued reference to FIG. 2, as discussed above, the CSD units 232 insert cyclic shifts into space time streams to prevent unintentional beamforming effects. In some embodiments, the particular cyclic shift values corresponding to OFDM tones are defined differently for at least some of the tones. Therefore, in these embodiments, if tone reordering is performed after cyclic shift insertion, in at least some cases, a mismatch exists between the applied CSD value and the CSD value that is defined for the particular channel over which the reordered OFDM tone is transmitted. This CSD value mismatch, in at least some situations, leads to decoding errors on the receiving end. Accordingly, in an embodiment, CSD values are also reordered according to the same reordering scheme that is used to reorder the OFDM tones, and in this case, no mismatch exists between the applied CSD value and the value defined for the subcarrier channel used to transmit the tone.

Similarly, in an embodiment, spatial mapping unit 236 applies beamforming matrices to the OFDM tones, wherein the particular matrix applied to an OFDM tone is based on the actual subcarrier channel over which the tone is transmitted. In this embodiment, if the OFDM tones are reordered after beamforming matrices are applied, applied beamforming matrices will then not match the actual subcarrier channels over which the reordered tones are transmitted. This mismatch between beamforming components and the transmission channel results in a decrease in performance at the receiving end, such as, for example, a decrease in signal to noise ratio, a decrease in throughput, an increase in packet error rate, etc. Accordingly, in one embodiment, beamforming matrices are also reordered according to the same scheme that is used to reorder the tones, and in this case, the applied beamforming matrices match the actual channel used to transmit the reordered OFDM tone, and in this case, the desired beamforming effect at the receiving end is therefore achieved.

In an embodiment, if tone reordering occurs after CSD insertion and after the spatial mapping, both the CSD value reordering and the beamsteering matrix reordering are performed.

In some embodiments, independent data corresponding to different client stations are transmitted by an access point simultaneously, which is hereby referred to as multi-user transmissions. In some embodiments utilizing multi-user transmissions, information data corresponding to the different users is encoded using different encoding techniques. For example, in one embodiment, a particular data unit is a two-user unit, that is, this data unit includes independent data transmitted simultaneously to two different client stations. In one such embodiment or scenario, BCC encoding is used to encode information bits for the first user (i.e., first client station), while LDPC encoding is used to encode information bits for the second user (i.e., second client station). In this embodiment, interleaving (e.g., by inerleavers 220 of FIG. 2) is performed for the BCC encoded bits corresponding to the first user. On the other hand, for the LDPC encoded bits corresponding to the second user, interleaving is not utilized. On the other hand, tone reordering is used only for the OFDM tones corresponding to the second user, according to an embodiment. Accordingly, in an embodiment in which tone reordering occurs after spatial mapping and/or after CSD insertion, the spatial matrices and/or cyclic shift values, respectively, corresponding to only the second user are reordered.

Figure 4:
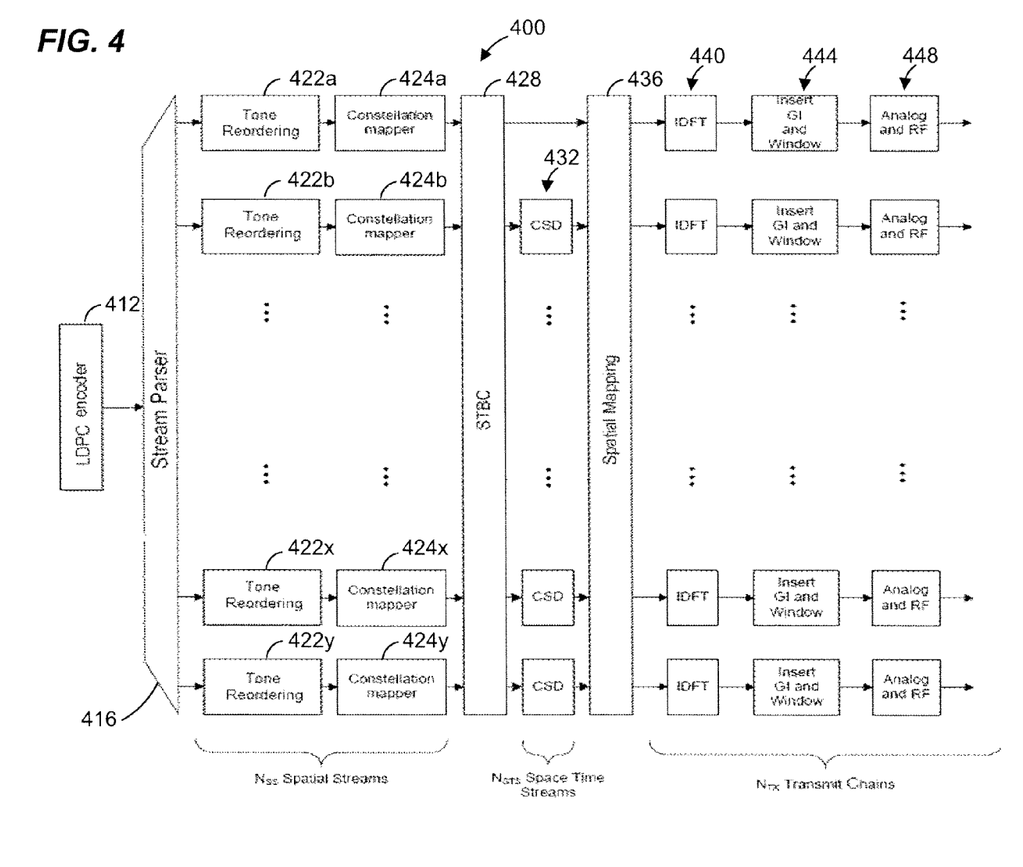
FIG. 4 is a block diagram of an example PHY processing unit configured to implement tone reordering, according to an embodiment

FIG. 4 is a block diagram of an example PHY processing unit 400 configured to implement tone reordering, according to an embodiment. The PHY processing unit 400 is similar to the PHY processing unit 200 (FIG. 2), except that the PHY processing unit 400 includes a respective tone ordering unit 422 coupled to each output of the spatial stream parser 416. In the PHY processing unit 400, the encoder 412 receives information bits to be included in an OFDM symbol and utilizes LDPC encoding to generate encoded information bits. In an embodiment, for each spatial stream, the corresponding tone ordering unit 422 reorders coded information bits or blocks of coded information bits according to a tone reordering function. The tone reordering function is generally defined such that consecutive coded information bits or blocks of information bits are mapped onto nonconsecutive tones in the OFDM symbol. In an embodiment, the tone reordering function is defined such that two consecutive coded bits (or blocks of bits) are mapped onto OFDM tones that are separated by a minimum distance D. For example, in one embodiment, the minimum distance D is defined as 3 OFDM tones, and accordingly, in this embodiment, consecutive coded bits (or blocks of bits), as a result of tone reordering, are separated by at least 3 tones. In another embodiment, another suitable distance D (such as 2, 4, 5, 6, etc.) is utilized.

In one embodiment, coded information bits are reordered in blocks of consecutive bits, wherein the blocks correspond to, for example, constellation points within a modulation symbol (corresponding to the MCS being utilized). In an embodiment, tone reordering of blocks of information bits prior to constellation mapping is equivalent to reordering the corresponding modulation symbols after constellation mapping is performed.

Figure 5:
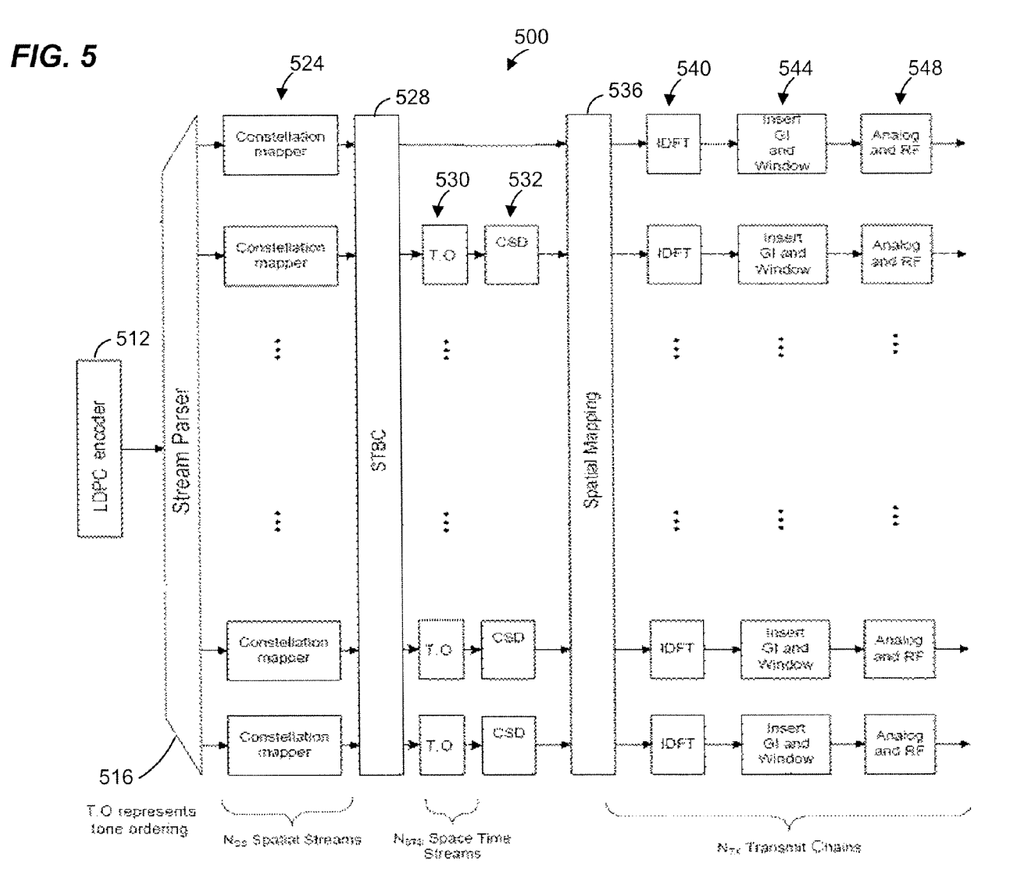
FIG. 5 is a block diagram of another example PHY processing unit configured to implement tone reordering, according to another embodiment.

FIG. 5 is a block diagram of another example PHY processing unit 500 configured to implement tone reordering, according to another embodiment. The PHY processing unit 500 is similar to the PHY processing unit 400 of FIG. 4, except that in the PHY processing unit 500 tone reordering is performed for each space time stream at the corresponding output of the space-time block coding unit 528. In this embodiment, tone reordering is performed after information bits have been mapped to constellation points. Accordingly, in this embodiment, the tone ordering units 530 change the order of modulation symbols according to a tone reordering function such that the reordered modulation symbols are mapped to non adjacent data tones within the OFDM symbol.

Figure 6:
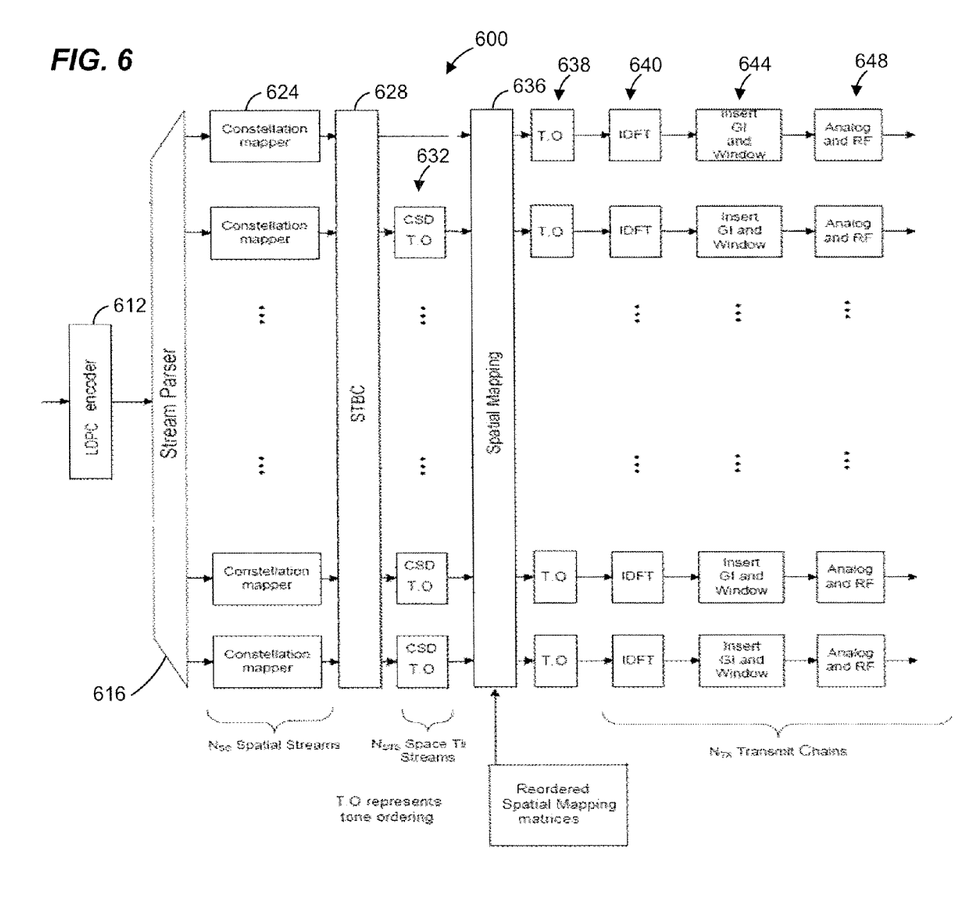
FIG. 6 is a block diagram of another example PHY processing unit configured to implement tone reordering, according to yet another embodiment.

FIG. 6 is a block diagram of another example PHY processing unit 600 configured to implement tone reordering, according to another embodiment. The PHY processing unit 600 includes a tone reordering 638 for each space-time stream at the corresponding output of the spatial mapping unit 636. Accordingly, in this embodiment, tone reordering is performed after cyclic shift insertion is performed (by CSD units 632) as well as after spatial stream mapping is performed (by the spatial mapping unit 636). Accordingly, in this embodiment, cyclic shift values and spatial stream matrices are also reordered according to the function used for reordering the corresponding OFDM tones, so that the applied cyclic shifts and the applied steering matrices, respectively, match the channels onto which the corresponding OFDM tones are mapped.

As an example of spatial mapping matrix reordering, in one embodiment, suppose a tone reordering function F(.) maps an input tone k to an output tone F(k). If there are N tones, in an embodiment, the corresponding spatial mapping matrices without reordering are represented by $\{Q_1, Q_2, \ldots, Q_N\}$. The reordered spatial mapping matrices then correspond to $\{Q_{F(1)}, Q_{F(2)}, \ldots, Q_{F(N)}\}$, according to an embodiment. Accordingly, in this embodiment, the output of the spatial mapping unit 636 is represented by $\{Q_{F(1)}x_1, Q_{F(2)}x_2, \ldots, Q_{F(N)}x_N\}$, where $Q_{F(k)}x_k$ is corresponds to spatially mapped data transmitted on the $f(k)_{th}$ tone. That is, in this embodiment, as a result of spatial mapping matrix reordering, a matrix applied to an OFDM tone matches the channel over which the tone is transmitted after tone reordering is performed.

Figure 7A:
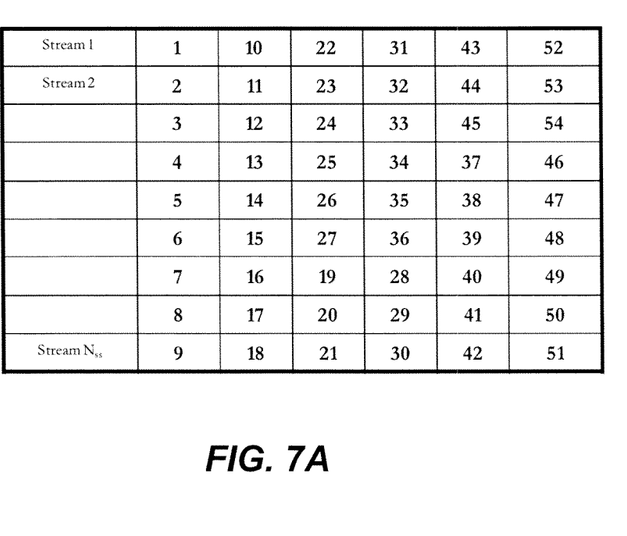
FIG. 7A illustrates an example of spatial stream bit distribution combined with tone reordering, according to an embodiment.
Figure 7B:
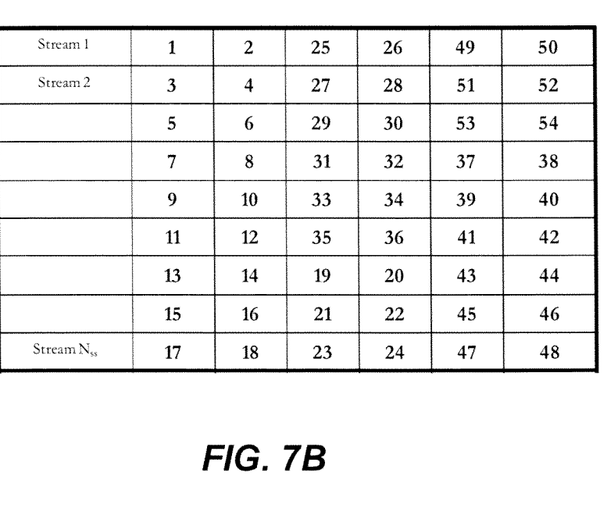
FIG. 7B illustrates an example of spatial stream bit distribution combined with tone reordering, according to an embodiment.

In one embodiment, tone reordering operation is combined with the spatial stream parsing operation. For example, referring back to FIG. 2, in one embodiment, tone reordering is performed by the stream parser 216. In this embodiment, the stream parser 216 assigns bits to different spatial streams in an order that distributes coded bits corresponding to a codeword over spatial streams and over a channel bandwidth. FIG. 7A illustrates one specific example of spatial stream bit distribution combined with tone reordering, according to one embodiment. In this example embodiment, a stream parser assigns consecutive bits to consecutive spatial streams, assigning one bit to each stream in one cycle according to the order illustrated in FIG. 7A. Similarly, FIG. 7B illustrates another specific example of spatial stream bit distribution combined with tone reordering, according to another embodiment. In this embodiment, a stream parser assigns consecutive bits to consecutive spatial streams, assigning two consecutive bits to each spatial stream in one cycle according to the order illustrated in FIG. 7B. In other embodiments, the stream parser 216 assigns bits to different spatial streams in a different suitable order that generally distributes consecutive information bits over a channel bandwidth. In tone reordering implementation, as a result of combining tone reordering with spatial stream parsing, in an embodiment, no extra memory specifically for tone reordering is utilized.

In some embodiments, a particular channel is a composite channel that is processed at least partially in two or more individual channels. In other words, in this embodiment, the composite channel comprises two or more individual channels, and the individual channels are processed individually. For example, in an embodiment, an 80 MHz channel is processed at least partially using two 40 MHz portions. As another example, a 160 MHz channel is processed at least partially using two 80 MHz portions, according to another embodiment. In some such embodiments, tone reordering techniques described herein are utilized for each of the individual channels. Depending on the location of the tone ordering unit within the PHY processing flow, in some embodiments, a separate tone ordering unit performs tone reordering for each of the individually processed channels, while in other embodiments a single tone ordering unit is used for the composite channel. Further, in an embodiment in which tone ordering is performed, for each of the individual channels, after spatial mapping, the spatial mapping matrices are reordering jointly for the entire composite channel. In an embodiment, joint reordering of the spatial mapping matrices ensures that OFDM tones are accurately mapped in a situation in which a tone from one individual channel is mapped to a tone in another individual channel.

Figure 8:
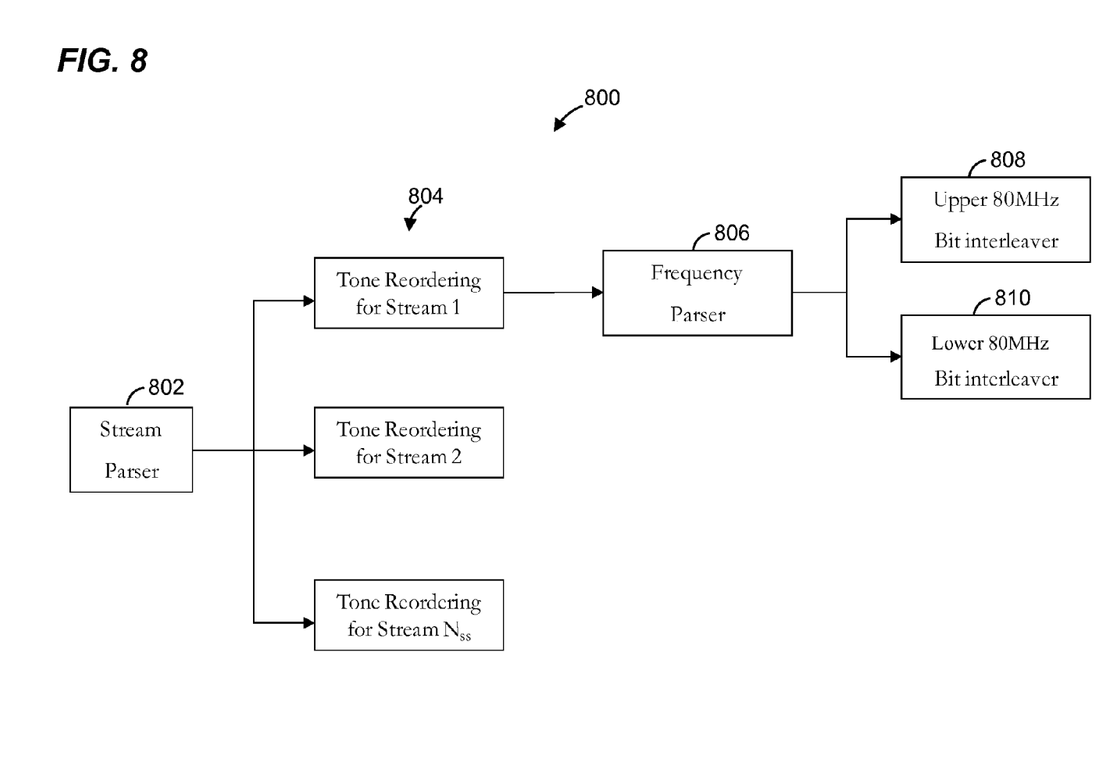
FIG. 8 is a block diagram of a PHY processing unit used for a composite channel, according to one embodiment.

FIG. 8 is a block diagram of a PHY processing unit 800 used for a composite 160 MHz channel, according to one embodiment. The PHY processing unit 800 includes a stream parser 802 that parses coded data bits into a number of spatial streams. Corresponding to each spatial stream or space-time stream, a tone ordering unit 804 performs OFDM tone reordering to distribute coded bits across the composite channel bandwidth. Also corresponding to each spatial stream, a frequency parser 806 parses coded and reordered bits into a first channel portion 808 and a second channel portion 810 (in this case, each portion corresponding to an 80 MHz subband. For ease of explanation, FIG. 8 shows a frequency parser 806, a bit interleaver 808 corresponding to a first channel portion, and a bit interleaver 810 corresponding to a second channel portion for only one of the spatial streams or space-time streams, however, in some embodiments, a frequency parser 806, a first bit interleaver 808, and a second bit interleaver 810 are included for each spatial stream.

Each bit interleaver 808 and 810 further interleaves the encoded and reordered bits, according to one embodiment. In another embodiment, a bit interleaver is only used for BCC encoded data bits, and not used for LDPC encoded data. In this embodiment, the bit interleavers 808, 810 are omitted in embodiments and/or scenarios utilizing LDPC encoding. Similarly, tone ordering units 804 are used only for data encoded using LDPC encoding in some embodiments. Accordingly, tone ordering units 804 in some embodiments and/or scenarios utilizing BCC encoding are omitted.

In one embodiment utilizing composite channel processing, tone reordering is combined with spatial stream parsing. In another embodiment utilizing composite channel processing, tone reordering is combined with frequency parsing. Accordingly, in this embodiment, frequency parsing is defined such that the coded bits are distributed over the composite channel bandwidth.

Figure 9:
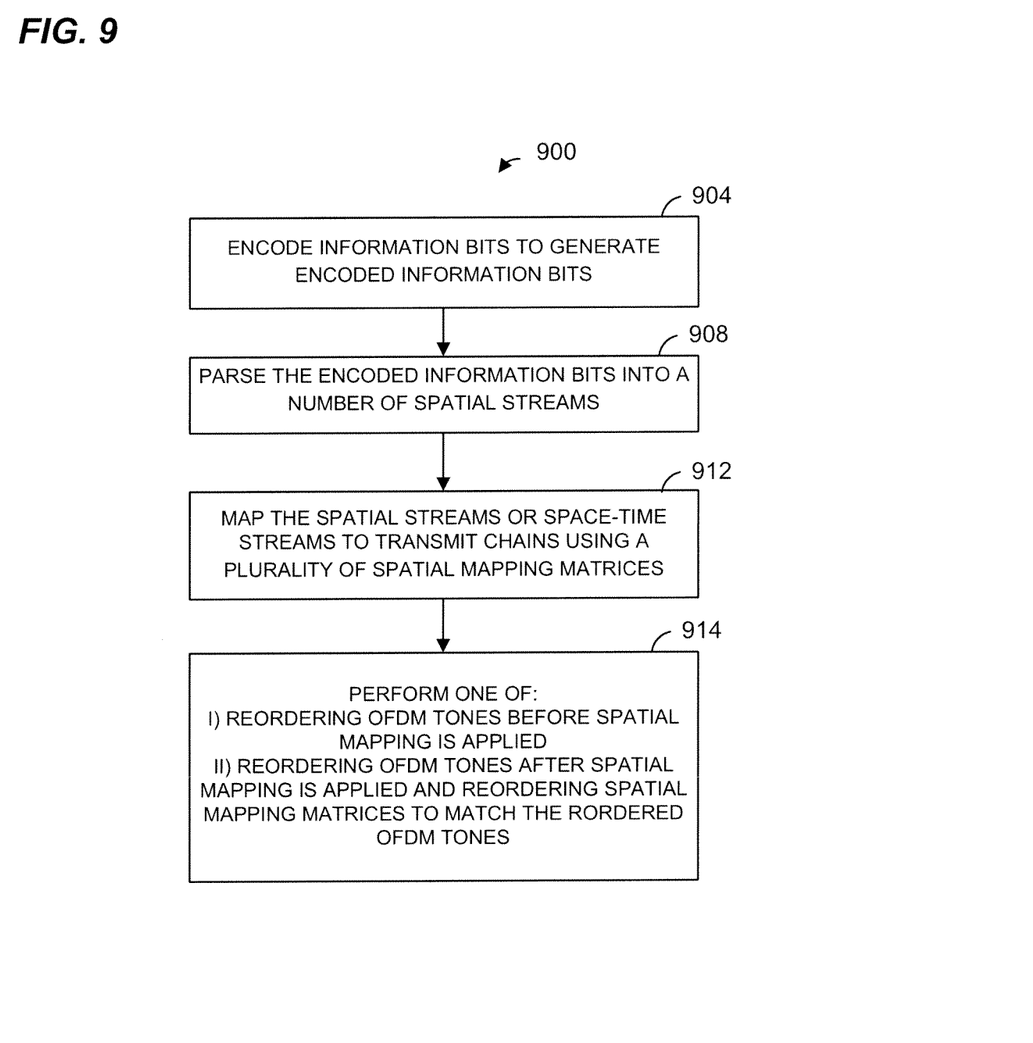
FIG. 9 is a flow diagram of an example method for generating an OFDM symbol, according to an embodiment.

FIG. 9 is a flow diagram of an example method 900 for generating an OFDM symbol, according to one embodiment. The method 900 is implemented by the network interface 16 (e.g., the PHY processing unit 20 of FIG. 1), in an embodiment. The method 900 is implemented by the network interface 27 (e.g., the PHY processing unit 29 of FIG. 1), in another embodiment. In other embodiments, the method 900 is implemented by other suitable network interfaces.

At block 904, information bits to be included in the OFDM symbol are encoded using one or more encoders. In one embodiment, information bits are encoded at block 904 using binary convolutional coding (BCC). In another embodiment, information bits are encoded at block 904 using a linear parity check code (LDPC). In one embodiment utilizing LDPC encoding, more than one codeword is needed to encode all information bits to be included in an OFDM symbol. In some embodiments, the OFDM symbol includes information to be transmitted simultaneously to more than one user. In one such embodiment, the information intended for a first user is encoded at block 904 using BCC, while information for a second user is encoded at block 904 using LDPC. In other embodiments, information is encoded at block 904 using other suitable coding techniques.

At block 908, the encoded information bits are parsed into a plurality of spatial streams. In an embodiment, a plurality of space-time streams is generated from the plurality of spatial streams using a space-time block coder (not shown in FIG. 9). In another embodiment, space-time encoding is not utilized. At block 912, the spatial streams or space-time streams are mapped to transmit chains using a plurality of spatial stream matrices, wherein each spatial stream matrix corresponds to an OFDM tone in the symbol. In one embodiment, spatial stream matrices are beamforming matrices used to steer a data unit in the direction of the intended receiver. In other embodiments, spatial streams are mapped to transmit chains using other suitable spatial mapping techniques.

At block 914, OFDM tone reordering is performed. In an embodiment, tone reordering is performed for tones onto which LDPC encoded bits are mapped in order to distribute consecutive coded bits or block of bits over a channel bandwidth. In another embodiment, tone reordering is alternatively or additionally performed for OFDM tones onto which BCC coded bits are mapped. In other embodiments tone reordering is performed for tones corresponding to information bits encoded using other suitable coding techniques. In an embodiment, if tone reordering is performed after spatial mapping, then the corresponding spatial mapping matrices are also reordered prior to applying the mapping matrices to the OFDM tones. On the other hand, in an embodiment, if tone reordering is performed before spatial mapping, that is, if the order of blocks 912 and 914 is interchanged, then spatial mapping matrix reordering at block 914 need not be performed.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media.

Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed:

1. A method for generating an orthogonal frequency division multiplexing (OFDM) symbol to be included in a physical layer (PHY) data unit for transmission via a communication channel, wherein the OFDM symbol includes a plurality of OFDM tones, the method comprising:

encoding, using a low density parity check (LDPC) encoder, information bits to be included in the OFDM symbol to generate encoded information bits, wherein two or more code words are used to encode information bits to be included in the OFDM symbol, and wherein encoded information bits corresponding to at least one of the two or more code words are to be entirely included in the OFDM symbol;

parsing the encoded information bits into a plurality of spatial streams;

for each spatial stream, parsing the encoded information bits into a first frequency portion corresponding to a first subband of the communication channel and a second frequency portion corresponding to a second subband of the communication channel; and for each frequency portion mapping the spatial streams, or space-time streams generated from the spatial streams, to transmit chains using a plurality of spatial mapping matrices corresponding to the plurality of OFDM tones, and reordering OFDM tones of the OFDM symbol such that information bits encoded using each of the two or more code words are distributed over a portion of the OFDM symbol, wherein the portion of the OFDM symbol corresponds to the corresponding subband of the communication channel, and wherein reordering OFDM tones includes performing one of:

i) reordering OFDM tones before spatial mapping is applied, or ii) reordering OFDM tones after spatial stream mapping is applied and reordering spatial mapping matrices to match the reordered OFDM tones; and generating the OFDM symbol to be included in the PHY data unit.

2. A method according to claim 1, further comprising:

for one or more of i) the spatial streams or ii) the space-time streams, applying cyclic shifts to the plurality of OFDM tones, wherein cyclic shift values are different for at least some of the OFDM tones;

if reordering OFDM tones is performed after cyclic shifts are applied, reordering cyclic shift values to match the reordered OFDM tones.

3. A method according to claim 1, wherein reordering OFDM tones is performed only for information bits encoded using low density parity check (LDPC) coding.

4. A method according to claim 1, further comprising:

generating an additional OFDM symbol, wherein information bits to be included in the additional OFDM symbol are encoded using binary convolutional coding (BCC), and wherein OFDM tone reordering is further performed for the information bits encoded using BCC.

5. A method according to claim 1, further comprising mapping the encoded information bits to constellation points, wherein:

reordering OFDM tones is performed after parsing the encoded information bits into the plurality of spatial streams and before mapping the encoded information bits to constellation points.

6. A method according to claim 5, wherein reordering OFDM tones comprises reordering blocks of the encoded information bits, wherein each block corresponds to a modulation symbol.

7. A method according to claim 1, wherein the PHY data unit is a multi-user data unit including independent data for at least i) a first user and ii) a second user, wherein data for the first user is encoded using binary convolutional coding (BCC), and data for the second user is encoded using low density parity check (LDPC) coding, and wherein:

reordering OFDM tones is performed only for OFDM tones corresponding to the second user; and if reordering OFDM tones is performed after spatial mapping matrices are applied, reordering spatial mapping matrices to match the reordered OFDM tones comprises reordering spatial stream matrices only for OFDM tones corresponding to the second user.

8. A method according to claim 1, wherein reordering OFDM tones is combined with parsing the encoded information bits into a number of spatial streams.

9. A method according to claim 1, wherein further comprising if reordering OFDM tones is performed after spatial stream mapping, reordering spatial mapping matrices to match the reordered OFDM tones comprises reordering spatial stream matrices jointly over the first subband of the communication channel and the second subband of the communication channel.

10. A method according to claim 9, wherein reordering OFDM tones is combined with frequency parsing the encoded information bits.

11. A method according to claim 1, further comprising applying space-time block coding to the plurality of spatial streams to generate a plurality of space-time streams.

12. An apparatus for generating an orthogonal frequency division multiplexing (OFDM) symbol to be included in a physical layer (PHY) data unit for transmission via a communication channel, wherein the OFDM symbol includes a plurality of OFDM tones, the apparatus comprising:

one or more low density parity check (LDPC) encoders configured to encode information bits to be included in the OFDM symbol to generate encoded information bits, wherein two or more code words are used to encode information bits to be included in the OFDM symbol, and wherein encoded information bits corresponding to at least one of the two or more code words are to be entirely included in the OFDM symbol;

a stream parser configured to parse the encoded information bits into a number of spatial streams;

a spatial mapping unit configured to map i) the spatial streams or ii) space-time streams generated from the spatial streams to transmit chains using a plurality of spatial mapping matrices corresponding to the plurality of OFDM tones;

a frequency parser configured to, for each spatial stream, parse the encoded information bits into a first frequency portion corresponding to a first subband of the communication channel and a second frequency portion corresponding to a second subband of the communication channel; and a tone ordering unit configured to, for each frequency portion, reorder OFDM tones such that modulation symbols corresponding to information bits encoded using each of the two or more code words are distributed over a portion of the OFDM symbol, wherein the portion of the OFDM symbol corresponds to the corresponding subband of the communication channel, and wherein the tone ordering unit is configured to perform at least one of:

i) reorder OFDM tones before spatial mapping is applied, or ii) reorder OFDM tones after spatial stream mapping is applied and reorder spatial mapping matrices to match the reordered OFDM tones; and wherein the apparatus is configured to generate the OFDM symbol to be included in the PHY data unit.

13. An apparatus according to claim 12, further comprising:

one or more cyclic shift diversity units configured to apply cyclic shifts to i) one or more spatial streams or ii) one or more space-time streams, wherein cyclic shift values are different for at least some of the OFDM tones, wherein the tone ordering unit is further configured to reorder cyclic shift values to match the reordered OFDM tones if reordering OFDM tones is performed after cyclic shifts are applied.

14. An apparatus according to claim 12, wherein the tone unit is configured to reorder OFDM tones only corresponding to information bits encoded using low density parity check (LDPC) coding.

15. An apparatus according to claim 12, wherein the tone unit is configured to reorder OFDM tones corresponding to
   i) information bits encoded using binary convolutional coding (BCC), and
   ii) information bits encoded using low density parity check (LDPC) coding.

16. An apparatus according to claim 12, further comprising:
   a constellation mapper configured to map the encoded information bits to constellation points,
   wherein the tone ordering unit is coupled between the stream parser and the constellation mapper for each of the spatial streams.

17. An apparatus according to claim 16, wherein the tone ordering unit is configured to reorder blocks of the encoded information bits, wherein each block corresponds to a modulation symbol.

18. An apparatus according to claim 12, wherein the PHY data unit is a multi-user data unit including independent data for at least i) a first user and ii) a second user, wherein data for the first user is encoded using binary convolutional coding (BCC), and data for the second user is encoded using low density parity check (LDPC) coding, and wherein:
   the tone ordering unit is configured to reorder only OFDM tones corresponding to the second user; and
   the tone ordering unit is configured to reorder spatial stream matrices only for OFDM tones corresponding to the second user if reordering OFDM tones is performed after spatial mapping matrices are applied.

19. An apparatus according to claim 12, wherein the spatial stream parser is further configured to reorder OFDM tones as a part of spatial stream parsing; and wherein the tone ordering unit is omitted.

20. An apparatus according to claim 12, wherein
   The tone ordering unit is configured to reorder spatial stream matrices jointly over the first subband of the communication channel and the second subband of the communication channel if reordering OFDM tone is performed after spatial stream mapping.

21. An apparatus according to claim 20, wherein the frequency parser is further configured to reorder OFDM tones as a part of frequency parsing, and wherein the tone ordering unit is omitted.

22. An apparatus according to claim 12, further comprising a space-time block coder to generate a plurality of space-time streams from the plurality of spatial streams.

* * * * *